(12) United States Patent
Hirabayashi et al.

(10) Patent No.: US 9,469,023 B2
(45) Date of Patent: Oct. 18, 2016

(54) POWER TOOLS

(75) Inventors: Shinji Hirabayashi, Anjo (JP); Tadasuke Matsuno, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 479 days.

(21) Appl. No.: 14/114,548

(22) PCT Filed: May 10, 2012

(86) PCT No.: PCT/JP2012/061951
§ 371 (c)(1),
(2), (4) Date: Oct. 29, 2013

(87) PCT Pub. No.: WO2012/165113
PCT Pub. Date: Dec. 6, 2012

(65) Prior Publication Data
US 2014/0374131 A1 Dec. 25, 2014

(30) Foreign Application Priority Data

Jun. 2, 2011 (JP) .................................. 2011-124056

(51) Int. Cl.
*B25B 23/14* (2006.01)
*B25F 5/00* (2006.01)
(Continued)

(52) U.S. Cl.
CPC .............. *B25F 5/001* (2013.01); *B23B 45/02* (2013.01); *B25B 21/00* (2013.01); *B25B 21/008* (2013.01);
(Continued)

(58) Field of Classification Search
CPC .......... B25F 5/00; B25F 5/021; B25F 5/001; B25B 23/14; B25B 23/141; B25B 23/1415; B25B 23/147; B25B 21/00; B23B 45/02; B23B 21/00; H02P 7/00; H02P 25/14; H02P 25/145; H02P 6/08

USPC .......... 173/2, 176, 178, 179, 181, 183, 216, 173/217; 318/139, 245, 257, 284, 287, 439, 318/484, 696, 798, 937, 248, 268, 599; 388/811, 903, 907, 937, 838
See application file for complete search history.

(56) References Cited

U.S. PATENT DOCUMENTS 3,828,865 A * 8/1974 Schnizler, Jr. ........ B25D 16/006
173/109
4,201,271 A * 5/1980 Evans ...................... B23Q 1/70
173/146
(Continued)

FOREIGN PATENT DOCUMENTS

CN 101637906 A 2/2010
CN 102738955 A 10/2012
(Continued)

OTHER PUBLICATIONS

International Search Report issued in International Patent Application No. PCT/JP2012/061951 dated Aug. 14, 2012 (with translation).
(Continued)

*Primary Examiner* — Scott A. Smith
(74) *Attorney, Agent, or Firm* — Oliff PLC

(57) ABSTRACT

A power tool has a continuously variable transmission, a condition detection device, and an operation control device. The continuously variable transmission changes a velocity of a rotational output from a drive motor and outputs the rotational output to a spindle to which a tip end tool is mounted. The condition detection device detects a condition of the power tool. The operation control device determines a target RPM of the spindle based on the condition of the power tool detected by the condition detection device, and controls an RPM of the drive motor and/or a transmission gear ratio of the continuously variable transmission based on the target RPM.

11 Claims, 8 Drawing Sheets

(51) Int. Cl.
  *B25B 21/00* (2006.01)
  *B23B 45/02* (2006.01)
  *B25B 23/147* (2006.01)
  *F16H 15/52* (2006.01)
  *H02P 25/14* (2006.01)
  *H02P 6/08* (2016.01)

(52) U.S. Cl.
  CPC ............. *B25B 23/14* (2013.01); *B25B 23/147* (2013.01); *B25F 5/00* (2013.01); *F16H 15/52* (2013.01); *H02P 6/08* (2013.01); *H02P 25/145* (2013.01)

(56) References Cited

U.S. PATENT DOCUMENTS

| | | | | |
|---|---|---|---|---|
| 4,412,158 A * | 10/1983 | Jefferson | ............... | H02P 25/145 318/257 |
| 4,442,906 A * | 4/1984 | Simpson | ............. | B25D 11/005 173/122 |
| 4,454,459 A * | 6/1984 | Huber | ................... | H02P 25/145 318/484 |
| 4,622,500 A * | 11/1986 | Budelman, Jr. | ....... | H02P 7/2913 318/599 |
| 4,689,534 A * | 8/1987 | Gerber | .................... | H01H 9/06 310/47 |
| 4,851,743 A * | 7/1989 | Schmerda | ............ | H02H 7/0833 388/811 |
| 5,105,130 A * | 4/1992 | Barker | ................... | B23B 45/02 318/268 |
| 5,738,177 A * | 4/1998 | Schell | .................... | B25B 23/14 173/178 |
| 5,961,418 A | 10/1999 | Taniguchi et al. | | |
| 5,986,417 A * | 11/1999 | Nicolai | ................... | H02P 25/14 318/245 |
| 6,029,754 A * | 2/2000 | Kattentidt | ............... | E21B 44/06 173/11 |
| 6,107,762 A * | 8/2000 | Schauer | ................. | H02P 25/14 318/245 |
| 6,401,837 B1 * | 6/2002 | Pan | .......................... | B25F 3/00 173/104 |
| 6,536,536 B1 * | 3/2003 | Gass | ..................... | B23B 31/123 173/171 |
| 6,854,529 B2 * | 2/2005 | Kuntze | .................. | B25D 16/00 173/1 |
| 7,274,866 B2 * | 9/2007 | Rudolf | ..................... | B25F 5/00 173/217 |
| 8,324,845 B2 * | 12/2012 | Suzuki | ..................... | B25F 5/00 318/139 |
| 8,476,853 B2 * | 7/2013 | Vanko | ...................... | B25F 5/00 173/176 |
| 2001/0050540 A1 * | 12/2001 | Takayama | ................ | H02P 6/08 318/599 |
| 2003/0089511 A1 * | 5/2003 | Tsuneda | ................. | B25B 21/00 173/217 |
| 2007/0000676 A1 * | 1/2007 | Arimura | ................ | B25B 21/02 173/179 |
| 2007/0097566 A1 * | 5/2007 | Woods | .................. | B24B 23/028 361/33 |
| 2007/0210733 A1 * | 9/2007 | Du | ......................... | H02K 1/278 318/268 |
| 2009/0051306 A1 * | 2/2009 | Matsunaga | ............... | H02P 6/08 318/434 |
| 2009/0096401 A1 * | 4/2009 | Watabe | .................... | B25F 5/00 318/446 |

FOREIGN PATENT DOCUMENTS

| | | |
|---|---|---|
| DE | 69 45 346 U | 4/1971 |
| JP | B2-3-73411 | 11/1991 |
| JP | A-6-190740 | 7/1994 |
| JP | A-9-314476 | 12/1997 |
| JP | A-10-181388 | 7/1998 |
| JP | A-2002-59370 | 2/2002 |
| JP | A-2002-66960 | 3/2002 |
| JP | A-2004-291143 | 10/2004 |
| JP | A-2011-16210 | 1/2011 |
| WO | 2011/004902 A1 | 1/2011 |

OTHER PUBLICATIONS

Nov. 2, 2014 Chinese Office Action issued in Application No. 201280025970.6.

May 19, 2015 Extended Search Report issued in European Application No. 12792610.3.

* cited by examiner

POWER TOOLS

BACKGROUND OF THE INVENTION

1. Field of the Invenstion

Embodiments of the present invention relate to a power tool containing an electric motor as the drive source. Embodiments of the present invention, for example, relate to a disc grinder, a screw fastening tool, an electric drill for drilling, etc.

2. Description of the Related Art

Generally speaking, a power tool is equipped with a velocity reduction gear row for reducing (diminishing) the output RPM of a drive motor, or a gear row for changing the output direction thereof. Apart from the above-mentioned gear row, a continuously variable transmission (CVT) configured to continuously vary the transmission gear ratio of the above-mentioned gear row is also well-known as a transmission for a drive motor. A well-known conventional continuously variable transmission utilizes a so-called traction drive mechanism. Japanese Laid-Open Patent Publication No. 6-190740, Japanese Laid-Open Patent Publication No. 2002-59370, and Japanese Patent Publication No. 3-73411 disclose electric tools containing a continuously variable transmission.

The traction drive type continuously variable transmission has a plurality of conical planetary rollers supported by a holder, and a sun roller to be rotated by a drive motor. The planetary rollers are held in press contact with the sun roller. They rotate by utilizing rolling contact generated between themselves and the sun roller, and orbit around an output shaft together with the holder. As a result, a rotational force is transmitted from the drive motor to the output shaft. Each planetary roller is held in press contact with the inner peripheral portion of an annular velocity-change ring. Through axial displacement of the velocity-change ring, the contact position of the velocity-change ring with respect to the planetary roller is displaced between a small diameter region and a large diameter region of the planetary roller. As a result, the orbiting velocity of the planetary roller with respect to the rotation of the planetary roller is determined, whereby the output RPM is determined. Thus, the output RPM can be continuously varied.

Japanese Laid-Open Patent Publication No. 6-190740 discloses a screw fastening tool containing a continuously variable transmission. In the screw fastening tool, a velocity-change ring is displaced to the low velocity side as the load torque imparted to a screw fastening bit increases (i.e., as the screw fastening proceeds). As a result, the output of the drive motor is continuously changed to low velocity and high torque by the continuously variable transmission. Thus, the RPM of the drive motor is changed in conformity with the operational mode before being output to a tip end cutter such as a drill bit. Thus, it is possible to easily perform a quick and reliable screw fastening operation.

However, the manner in which the power tool is operated differs from operator to operator. For example, when performing a screw fastening operation using an electric screw fastener, the user maintains the pulling amount of a starting switch lever in a half-pulled state at the early stage of screw fastening, giving high priority to low velocity rotation of the bit (spindle). At the final stage of screw fastening, the user maintains the switch lever in a fully pulled state to cause the motor to rotate at a high velocity. Thus, in accordance with various factors such as the nature of the operation, operational stage, and operational condition, the user varies the operation amount of the operation member such as a switch lever. This varies the output RPM and the output torque in conformity with the nature of the operation, etc. as appropriate.

However, there is variation in the operation amount of the operation member, the switching timing for it, etc. in accordance with the user. Further, there is difficulty in repeatedly performing a uniform operation. Thus, there is a need for a power tool configured to appropriately control the RPM of the drive motor and the transmission gear ratio of the continuously variable transmission according to the operational condition, etc., which makes it possible to repeatedly attain a uniform operation.

SUMMARY OF THE INVENTION

According to an aspect of the present invention, there is provided a power tool having a continuously variable transmission, a condition detection device, and an operation control device. The continuously variable transmission changes a velocity of a rotational output from a drive motor then outputs the rotational output to a spindle to which a tip end tool is mounted. The condition detection device detects a condition of the power tool. The operation control device determines a target RPM of the spindle based on the condition of the power tool detected by the condition detection device, and controls an RPM of the drive motor and/or a transmission gear ratio of the continuously variable transmission based on the target RPM.

Accordingly, the condition detection device detects, as the conditions of the power tool, an operation amount or operational force of an operation member, an electric current value or temperature of the drive motor, the RPM or output torque of the spindle, and changes with passage of time of each condition, etc. Based on these conditions, one or both of the RPM of the drive motor and the transmission gear ratio of the continuously variable transmission, are controlled appropriately. Thus, the RPM of the drive motor and the transmission gear ratio of the continuously variable transmission are controlled automatically and appropriately with a high level of reproducibility according to the operational condition. Thus, it is possible to achieve an improvement in terms of operational efficiency and uniformity.

DETAILED DESCRIPTION OF THE INVENTION

An embodiment of the present invention will be described with reference to FIGS. 1 to 13. A power tool 1 is a rechargeable driver drill. The power tool 1 is equipped with a substantially columnar tool main body 2, a handle 3 protruding laterally from a side portion of the tool main body 2, and a battery pack 4 attached to the tip end of the handle 3.

Figure 1:
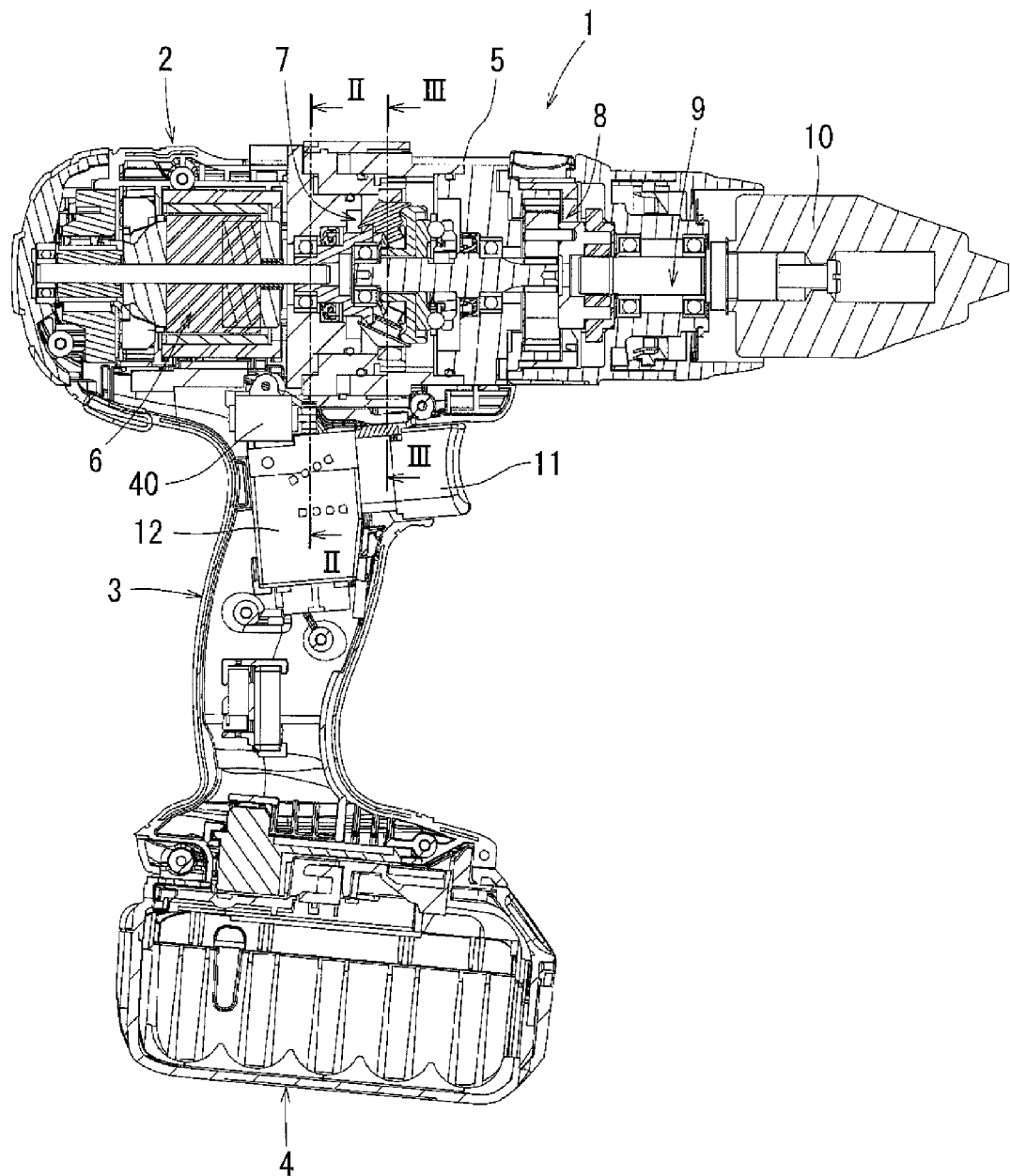
FIG. 1 is a vertical cross-sectional view of a rechargeable driver drill as a power tool according to an embodiment of the present invention.
Figure 2:
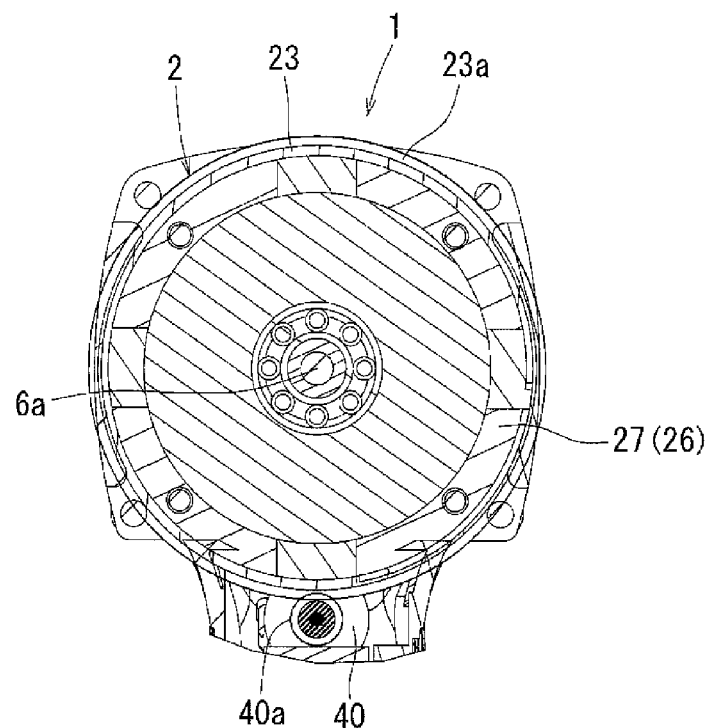
FIG. 2 is a cross-sectional view taken along line II-II in FIG. 1.

As shown in FIG. 1, the tool main body 2 is equipped with a drive motor 6, a CVT (continuously variable transmission) 7, a gear transmission 8, and a spindle 9, which are arranged inside a main body housing 5 in order from the rear side. A chuck 10 for attaching a tip cutter is provided at the tip end of the spindle 9. The rotational output of the drive motor 6 is continuously varied by the CVT 7, and is further reduced in velocity at a fixed transmission gear ratio by the gear transmission mechanism 8 before being output to the spindle 9.

As shown in FIG. 1, a trigger type switch lever 11, which is pulled with a fingertip of a grasping hand of a user, is arranged near a proximal portion of the handle 3. When the switch lever 11 is pulled, a switch main body 12 on the rear side of the switch lever 11 is turned on, and the drive motor 6 is started. A so-called variable switch is used as the switch main body 12. In the switch, resistance value varies according to a pulling amount of the switch lever 11, and electric current supplied to the drive motor 6 is changed. Thus, it is possible to arbitrarily vary the output RPM of the drive motor 6.

The drive motor 6 is started using the battery pack 4 as the power source. The battery pack 4 can be repeatedly used by detaching the battery pack 4 from the tip end of the handle 3 and charging the battery pack 4 by a separately prepared charger.

Figure 4:
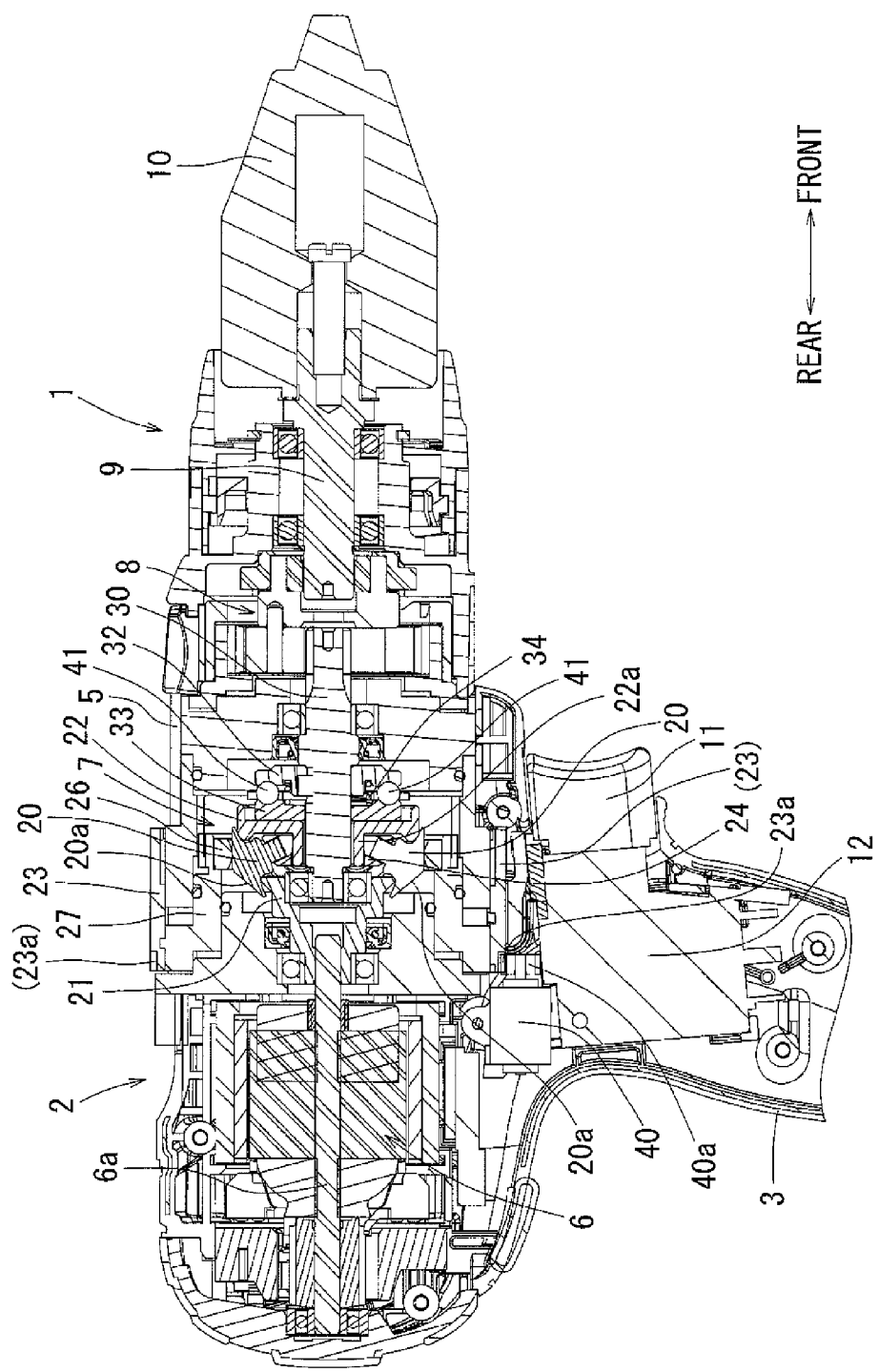
FIG. 4 is a cross-sectional view of a tool main body when a continuously variable transmission is set at a high velocity rotation through a transmission ring contacting a small diameter region of a planetary roller.
Figure 5:
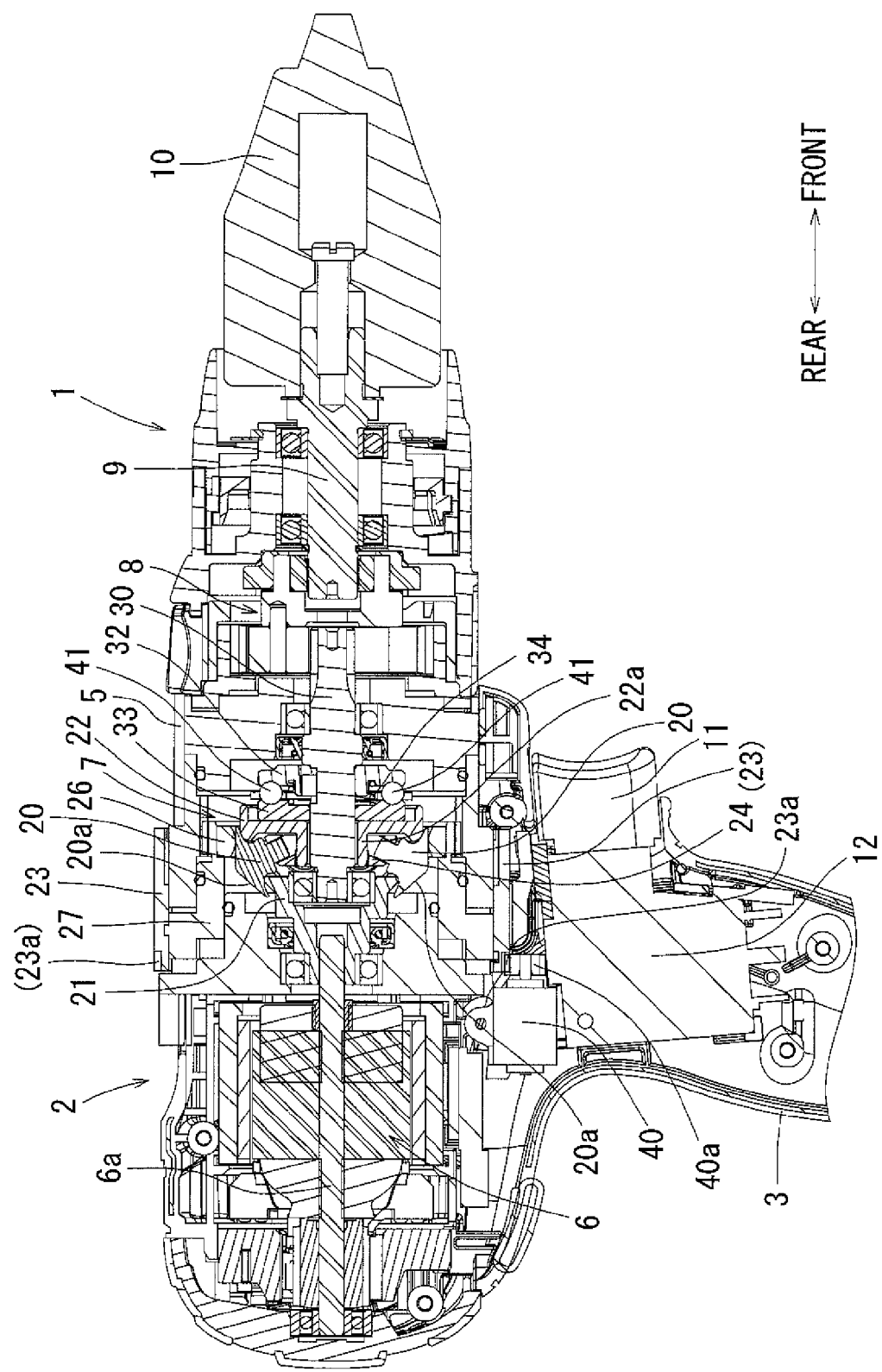
FIG. 5 is a cross-sectional view of the tool main body when the continuously variable transmission is set at a low velocity rotation through the transmission ring contacting a large-diameter region of the planetary roller.
Figure 7:
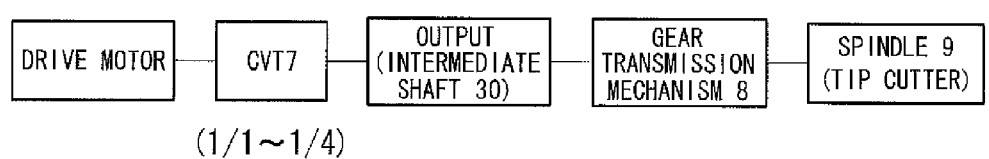
FIG. 7 is a schematic view of a power transmission route of the power tool.

As shown in FIG. 7, the gear transmission mechanism 8 is arranged on a front side of the CVT 7 (i.e., on a downstream side in a power transmission route). A planetary gear mechanism is used as the gear transmission mechanism 8. FIGS. 4 and 5 show in detail the power transmission route from the drive motor 6 to the spindle 9.

The CVT 7 is a three-point press contact type traction drive mechanism, and has a plurality of planetary rollers 20. The plurality of planetary rollers 20 are supported by a single holder 24 at equal intervals peripherally. Each planetary roller 20 is held in press contact with a sun roller 21, a pressure roller 22, and a transmission ring 26.

The sun roller 21 is mounted to an output shaft 6a of the drive motor 6 and rotates integrally therewith. The pressure roller 22 is held in press contact with a neck portion of each planetary roller 20 on the side axially opposite the sun roller 21 (on the downstream side in the power transmission route, i.e., on the right-hand side in FIGS. 4 and 5).

As shown in FIG. 4, an intermediate shaft 30 is arranged coaxially with the output shaft 6a of the drive motor 6. The holder 24, the pressure roller 22, a thrust plate 33, and a stationary plate 32 are supported on the intermediate shaft 30. A boss portion 22a is provided on a rear surface of the pressure roller 22. The holder 24 is supported by the boss portion 22a so as to allow relative rotation. A compression spring 34 is provided between the thrust plate 33 and the stationary plate 32. A plurality of cam grooves are formed peripherally in a front surface of the thrust plate 33. A plurality of cam grooves are formed peripherally in the rear surface of the stationary plate 32. Each steel ball 41 is installed between each cam groove of the thrust plate 33 and each cam groove of the stationary plate 32. Due to a force in the torque axial direction generated by an urging force of the compression spring 34 and the steel balls 41, there is generated press contact force of the sun roller 21, the pressure roller 22, and the transmission ring 26 with respect to the planetary rollers 20.

Figure 3:
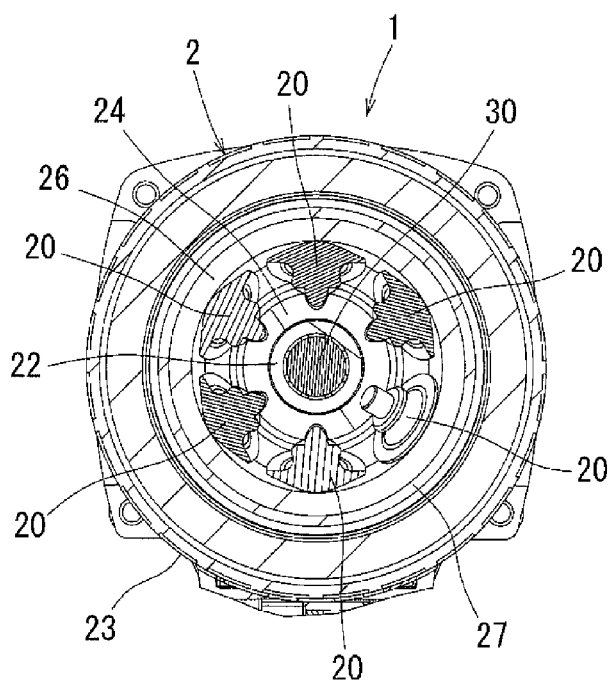
FIG. 3 is a cross-sectional view taken along line III-III in FIG. 1.

As shown in FIGS. 3 and 4, the transmission ring 26 is of an annular configuration. A conical surface 20a of each planetary roller 20 is held in press contact with the inner peripheral surface of the transmission ring 26. The transmission ring 26 is fixed in position so as to extend along the inner surface of a ring holder 27. The ring holder 27 is supported so as to be capable of displacement within a fixed range in the axial direction (the horizontal direction in the drawing) with respect to the main body housing 5. When the ring holder 27 moves in the axial direction, the transmission ring 26 moves in the axial direction of the spindle (the horizontal direction as seen in FIGS. 4 and 5). As a result, the transmission ring 26 contacts a region between a small diameter region and a large diameter region of the conical surface 20a of each planetary roller 20.

As the sun roller 21 rotates, each planetary roller 20 rotates. Each planetary roller 20 orbits around the sun roller 21 as the planetary roller 20 is in press contact with the transmission ring 26. The orbit direction of each planetary roller 20 and the rotational direction of the pressure roller 22 are opposite. Thus, as shown in FIG. 4, when the transmission ring 26 contacts the small diameter region of each planetary roller 20, the orbiting velocity of the planetary roller 20 is reduced. As a result, the rotational velocity of the pressure roller 22 is going to be high, and the rotational velocity of the intermediate shaft 30 is going to be high (small transmission gear ratio). As shown in FIG. 5, when the transmission ring 26 is displaced to the large diameter region of each planetary roller 20, the orbiting velocity of the planetary roller 20 increases. As a result, the rotational velocity of the pressure ring 22 is going to be low, and the rotational velocity of the intermediate shaft 30 is going to be low (large transmission gear ratio). In this way, the press contact position of the transmission ring 26 with respect to each planetary roller 20 varies, whereby the intermediate shaft 30 is continuously varied in velocity.

As shown in FIG. 4, the gear transmission mechanism 8 is connected to a front portion of the intermediate shaft 30. A planetary gear mechanism is used as the gear transmission mechanism 8. Due to the gear transmission mechanism 8, the rotational velocity of the intermediate shaft 30 is reduced at a fixed transmission gear ratio before being output to the spindle 9.

As shown in FIGS. 4 and 5, the ring holder 27 is displaced in the axial direction through the rotation of a transmission sleeve 23 provided in the main body housing 5. When the ring holder 27 is displaced in the axial direction, the transmission ring 26 moves between a position where the transmission ring 26 contacts the small diameter region of the conical surface 20a of each planetary roller 20 and a position where the transmission ring 26 contacts the large diameter region of the conical surface 20a.

As shown in FIGS. 4 and 5, a transmission motor 40 is provided near the proximal portion of the handle 3. A pinion gear 40a is mounted to an output shaft of the transmission motor 40. The pinion gear 40a meshes with a rack gear portion 23a provided on an outer peripheral surface of a transmission sleeve 23. When the transmission motor 40 generates normal or reverse rotation, the transmission sleeve 23 moves through the mesh-engagement between the pinion gear 40a and the rack gear portion 23a. Through the movement of the transmission sleeve 23, the ring holder 27 and the transmission ring 26 are integrally displaced in the axial direction. As a result, the transmission ring 26 contacts the small diameter region of the conical surface 20a of each planetary roller 20 to cause high velocity rotation of the intermediate shaft 30; or the transmission ring 26 contacts the large diameter region of the conical surface 20a to cause high velocity rotation of the intermediate shaft 30.

Figure 6:
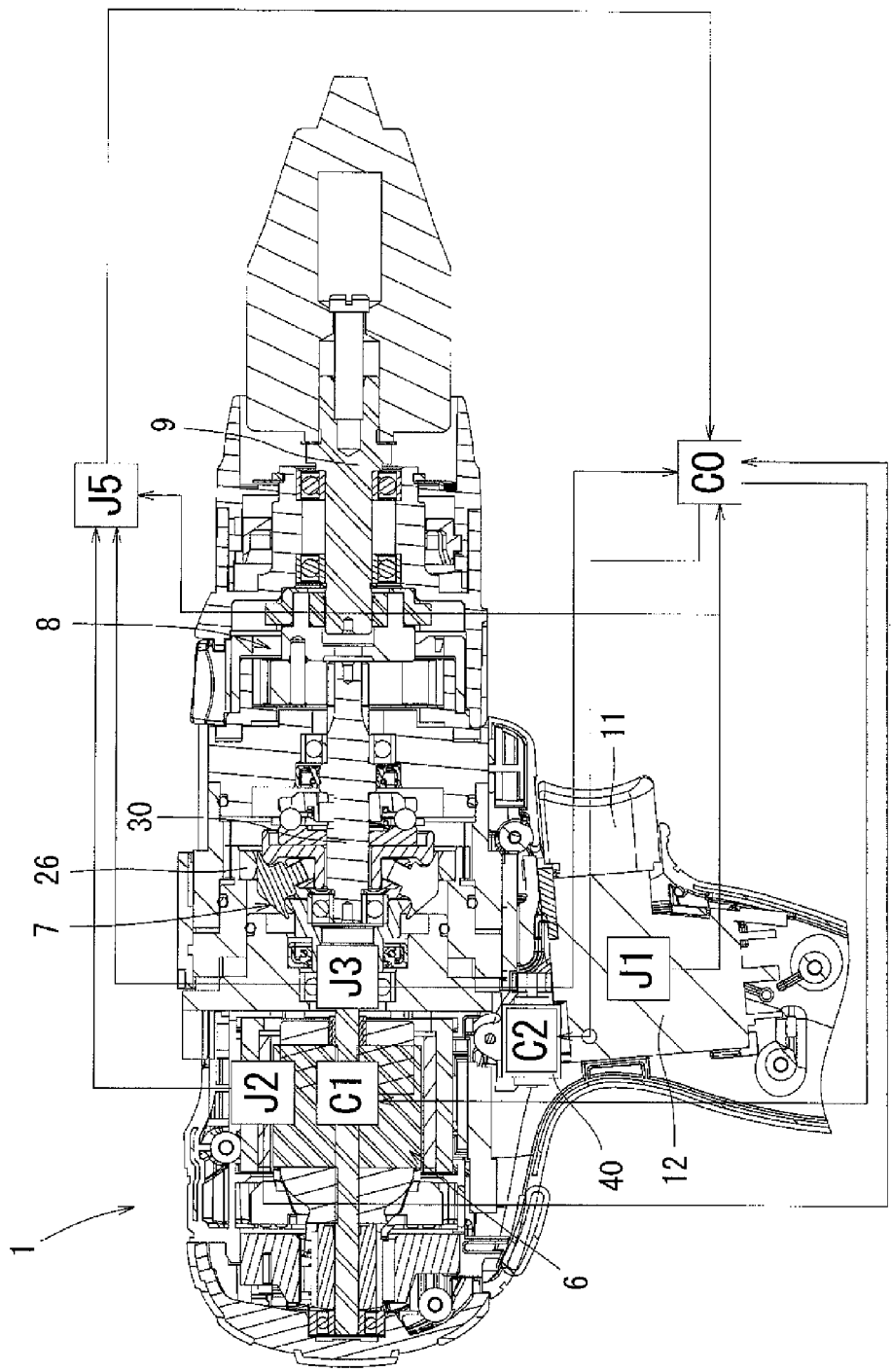
FIG. 6 is a view for showing the operation of a control device of the power tool.

As shown in FIG. 6, the power tool 1 is equipped with an operation control device C0 configured to control the RPM of the drive motor 6 and the transmission gear ratio of the CVT 7. The operation control device C0 is equipped with a drive motor control circuit C1 configured to control the output RPM of the drive motor 6, and a transmission motor control circuit C2 configured to control the transmission gear ratio of the CVT 7. The transmission motor control circuit C2 changes the transmission gear ratio of the CVT 7 by controlling start/stop timing, rotational direction, and RPM of the transmission motor 40.

The power tool 1 is provided with condition detection devices J1 to J3 and J5 configured to detect the condition of the power tool 1. The first condition detection device J1 detects a pulling amount of the switch lever 11 based on a change in a variable resistance value of the switch main body 12. The second condition detection device J2 detects a value of the electric current supplied to the drive motor 6, and during operation a load torque applied to the tip end tool is detected from the electric current value. The third condition detection device J3 detects a temperature of the drive motor 6. The fifth condition detection device J5, to which the output signals are input from the first to third condition detection devices, detects changes in each signal with passage of time. The condition detection devices J1 to J3 and J5 transmit signals to the operation control device C0 including information of various conditions.

The condition detection devices J1 to J3 and J5 detect the condition of the power tool 1, which undergoes various changes due to factors such as the nature of the operation, the proceeding condition thereof, etc. Based on the signal received, the operation control device C0 controls the output RPM of the drive motor 6 by the drive motor control circuit C1, and controls the transmission gear ratio of the CVT 7 by the transmission motor control circuit C2. In the present embodiment, a device (a fourth detection device) configured to detect the stress condition of each member forming the drive transmission system such as the CVT 7, the intermediate shaft 30, and the spindle 9, is omitted.

Figure 8:
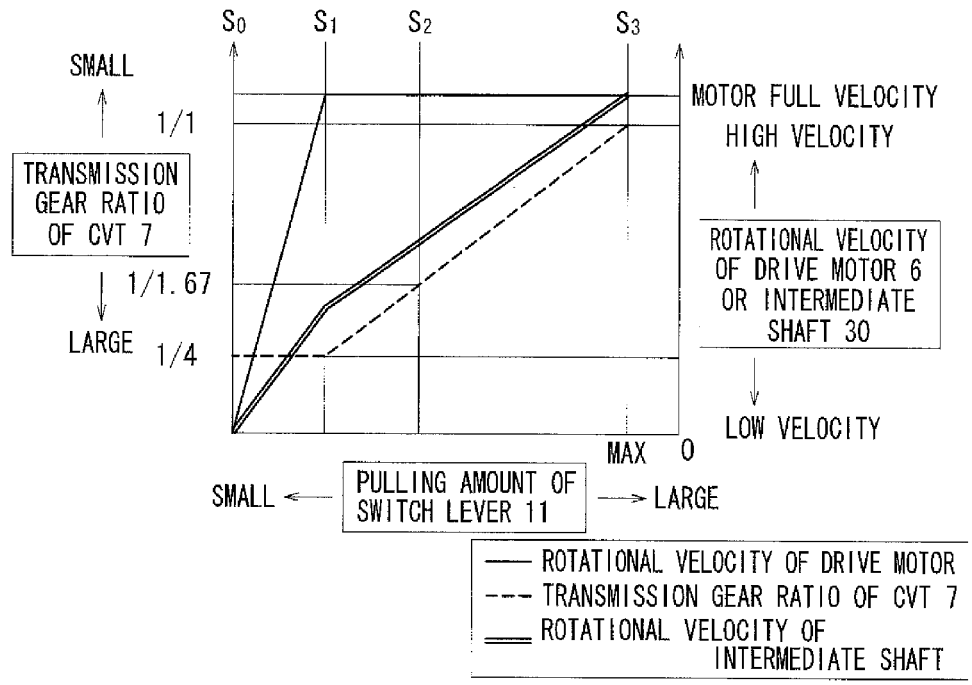
FIG. 8 is a graph for showing a rotational velocity of a drive motor, a transmission gear ratio of the continuously variable transmission and a rotational output velocity in relation to operational amounts of a switch lever.

In the initial state S0, in which the switch lever 11 has not been pulled yet, the drive motor 6 is at rest, so that, as shown in FIG. 8, the output RPM (right-hand scale) of the intermediate shaft 30 is zero. An initial setting is made such that the transmission gear ratio of the CVT 7 is 1/4 (L0), signifying a low velocity state.

At the stage (S0 to S1), in which the switch lever 11 has only begun to be pulled and in which the pulling amount is small, the resistance value of the switch main body 12 is changed according to the pulling amount. As a result, the RPM of the drive motor 6 increases linearly as indicated by the solid line of FIG. 8, and a full velocity state is attained. During this time, the transmission motor 40 is not started as indicated by the dotted line in FIG. 8, and the transmission gear ratio of the CVT 7 is maintained at 1/4 (L0). Thus, the RPM of the intermediate shaft 30 increases linear like the RPM of the drive motor 6, and the RPM of the intermediate shaft 30 is 1/4 of the RPM of the drive motor 6.

After the RPM of the drive motor 6 attains the full velocity state (S1), the pulling amount of the switch lever 11 continues to increase (S1 to S3); then, as indicated by the solid line of FIG. 8, the drive motor 6 is maintained in the full velocity state. At this time, the transmission motor 40 is started, and the transmission ring 26 is displaced from the large diameter region to the small diameter region of each planetary roller 20. The transmission gear ratio of the CVT 7 is gradually reduced as indicated by the dotted lie in FIG. 8 (It is increased in FIG. 8). Thus, the transmission gear ratio of the CVT 7 is reduced while the RPM of the drive motor 6 is maintained in the full velocity state. Thus, the output RPM of the intermediate shaft 30 increases linearly as the pulling amount of the switch lever 11 increases. In the totally pulled state (S3), in which the switch lever 11 has been pulled to the utmost, the drive motor 6 is in the full velocity state, and a transmission gear ratio of 1/1 is attained in the CVT 7. As a result, the intermediate shaft 30 rotates at the same RPM as the drive motor 6. The spindle 9 and the tip cutter are rotated at an RPM reduced by the gear transmission mechanism 8.

Thus, solely through the operation of pulling the switch lever 11, it is possible to perform both transmission control of the drive motor 6 and transmission control of the CVT 7. Thus, solely through the operation of the switch lever 11, it is possible to widely set the RPM of the intermediate shaft 30 and the spindle 9. At the stage where the switch lever 11 begins to be pulled, high priority is given to the RPM of the drive motor 6 to increase the same. In the full velocity state (high-output state) of the drive motor 6, transmission of the CVT 7 is effected. Thus, the power tool 1 is enhanced in efficiency, and the drive motor 6 is not easily locked due to over-torque.

As shown in FIG. 8, in the case where the pulling amount of the switch lever 11 is maintained in the half-pulled state S2, the transmission gear ratio of the CVT 7 is 1/1.67 (approximately 60%), and the drive motor 6 rotates at full velocity. Thus, the intermediate shaft 30 rotates at an RPM that is approximately 60% of the RPM of the drive motor 6.

When a drilling operation or the like is performed while maintaining the half-pulled state S2, there is a change in the external torque (load torque) applied to the intermediate shaft 30 via the tip cutter and the spindle 9.

Figure 9:
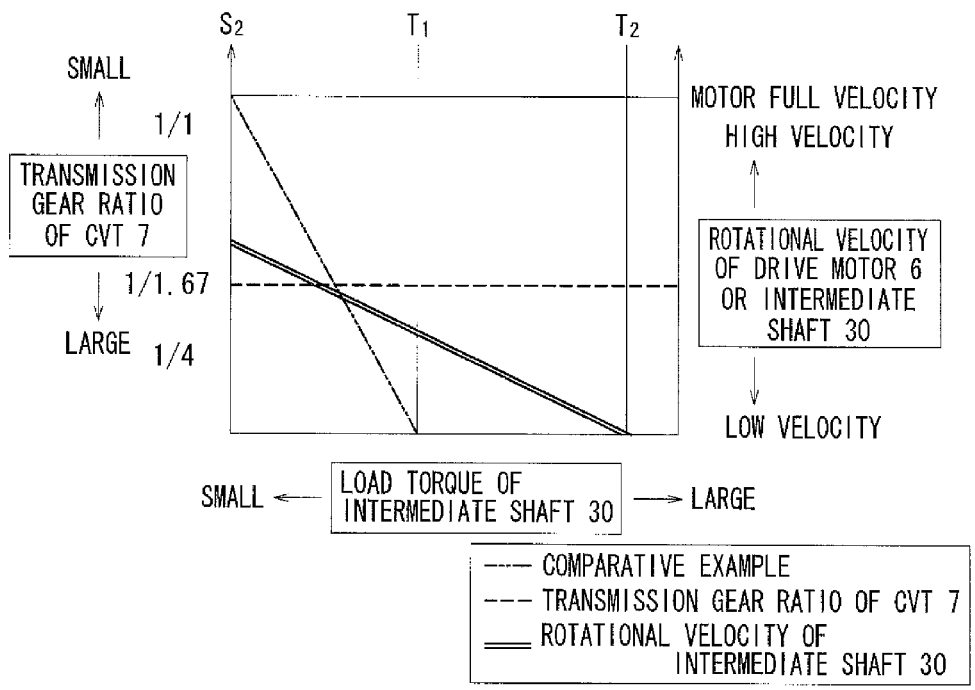
FIG. 9 is a graph for showing the rotational velocity of the drive motor, the transmission gear ratio of the continuously variable transmission and the rotational output velocity in relation to load torque amounts in the condition that the operational amount of the switch lever is maintained constantly.

The double line in FIG. 9 indicates a change in the RPM of the intermediate shaft 30 with respect to a change in the external torque. The chain double-dashed line in FIG. 9 indicates a comparative example. In the comparative example, the spindle 9 is directly connected with the output shaft of the drive motor 6. The chain double-dashed line in FIG. 9 indicates the change in the RPM of the drive motor 6 of the comparative example with respect to the change in external torque.

When the load torque in the second intermediate shaft 30 increases, the RPM of the drive motor 6 is reduced linearly (S2 to T1). As indicated by the dashed line in FIG. 9, in the half-pulled state S2 of the switch lever 11, the transmission motor 40 is not started, and the transmission gear ratio of the CVT 7 is maintained at 1.67. Thus, the RPM of the intermediate shaft 30 is also linearly reduced while being maintained at approximately 60% of the RPM of the drive motor 6.

In the comparative example, over-torque is applied to the drive motor 6 when the load torque is T1, and the output RPM is reduced to zero. On the other hand, in the present embodiment, the RPM is reduced by the CVT 7, and the torque applied to the intermediate shaft 30 increases. Thus, the intermediate shaft 30 can rotate until the load torque attains T2, which is larger than T1. Thus, it is possible to avoid a stop in the rotation due to over-torque of the drive motor 6. As a result, the user can perform a drilling operation at a relatively low RPM allowing easy operation with a high motor output. Since it is possible to rotate the drill bit with a high output and at low velocity, it is possible for the user to start the drilling operation carefully and assuredly.

As shown in FIG. 8, the operation control device C0 automatically and appropriately controls the RPM of the drive motor 6 and the transmission gear ratio of the CVT 7 in accordance with the pulling amount of the switch lever 11 (the first and fifth condition detection devices J1 and J5) by a drive motor control circuit C1 and a transmission motor control circuit C2, respectively. More specifically, high priority is given so that the RPM of the drive motor 6 is increased while maintaining a high transmission gear ratio for the CVT 7. As a result, it is possible to rotate the drill bit with high torque.

As shown in FIG. 9, the operation control device C0 automatically switches the control mode when the pulling amount of the switch lever 11 is fixed to the half-pulled state S2, which corresponds to approximately half of the total operation amount. The second and fifth condition detection devices J2 and J5 detect fluctuations in the load torque during operation. The RPM of the drive motor 6 is controlled automatically and appropriately by the drive motor control circuit C1. More specifically, when the load torque is received, the transmission gear ratio of the CVT 7 is maintained at a fixed level. As a result, it is possible to perform a drilling operation or the like using the half-pulled state of the switch lever 11 at low velocity and with high output. It is also possible to suppress locking of the drive motor 6 by over-torque. As a result, it is possible to perform a drilling operation or the like carefully and assuredly.

Figure 10:
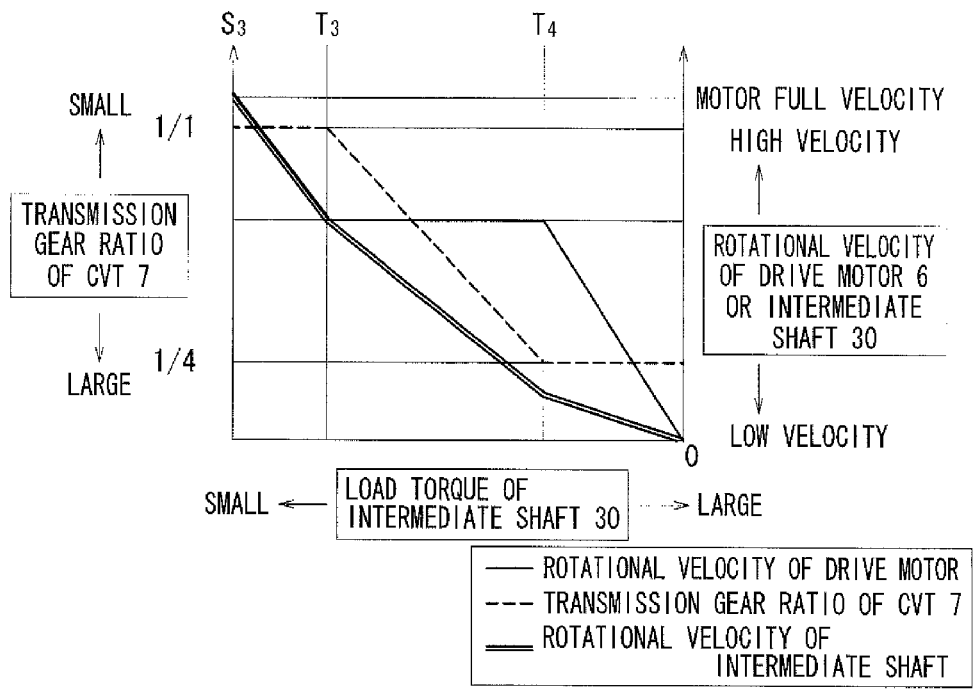
FIG. 10 is a graph for showing the rotational velocity of the drive motor, the transmission gear ratio of the continuously variable transmission and the rotational output velocity in relation to load torque amounts in the condition that the operational amount of the switch lever is at its maximum.

FIG. 10 shows the RPM of the drive motor 6 and the transmission gear ratio of the CVT 7 when an operation is performed with the switch lever fully pulled (S3 in FIG. 8) and with the load torque increased. As the load torque of the intermediate shaft 30 increases (S3 to T3), the RPM of the drive motor 6 is reduced linearly from the full velocity state.

At the stage where the load torque is small (S3 to T3), the transmission motor 40 is not started, and the transmission gear ratio of the CVT 7 is maintained at 1/1 as indicated by the dashed line in FIG. 10. Thus, the RPM of the intermediate shaft 30 is the same RPM as the RPM of the drive motor 6, and is reduced linearly.

As indicated by the dashed line in FIG. 10, when the load torque of the intermediate shaft 30 attains a predetermined value (T3), the transmission motor 40 is started, and the transmission ring 26 begins to be displaced to the large-diameter region of each planetary roller 20. As a result, the transmission gear ratio increases. At the point in time T3, it is possible to maintain an RPM which is somewhat lower than the RPM of the drive motor 6 in the full velocity state but which is a relatively high RPM.

As indicated by the solid line in FIG. 10, at the stage of T3 to T4, it is possible for the RPM of the drive motor 6 to be maintained at a relatively high RPM. As indicated by the dashed line in FIG. 10, with the increase in the load torque of the intermediate shaft 30, the transmission gear ratio of the CVT 7 increases linearly from 1/1 to 1/4. When the load torque attains T4, the transmission gear ratio of the CVT 7 is 1/4 at its maximum, and the RPM of the intermediate shaft 30 is 1/4 of the RPM of the drive motor 6. At this point in time T4, the transmission motor 40 is stopped, and the transmission ring 26 is retained in the large-diameter region. As a result, the transmission gear ratio of the CVT 7 is maintained at 1/4, which is the maximum. When the load torque of the intermediate shaft 30 further increases, the RPM of the drive motor 6 decreases. As a result, the RPM of the intermediate shaft 30 also decreases.

The second condition detection device J2 detects the value of the electric current supplied to the drive motor 6. In this way, the second condition detection device J2 can obtain the amount of the load torque. When the load torque is in the range of T3 to T4, the drive motor control circuit C1 maintains the RPM of the drive motor 6 at a relatively high level. The transmission motor control circuit C2 controls the transmission motor 40 to automatically control the transmission gear ratio of the CVT 7. That is, the transmission gear ratio of the CVT 7 increases with the increase in load torque, and the RPM of the intermediate shaft 30 decreases. As a result, the efficiency of the drive motor 6 is controlled to an optimum level.

Figure 11:
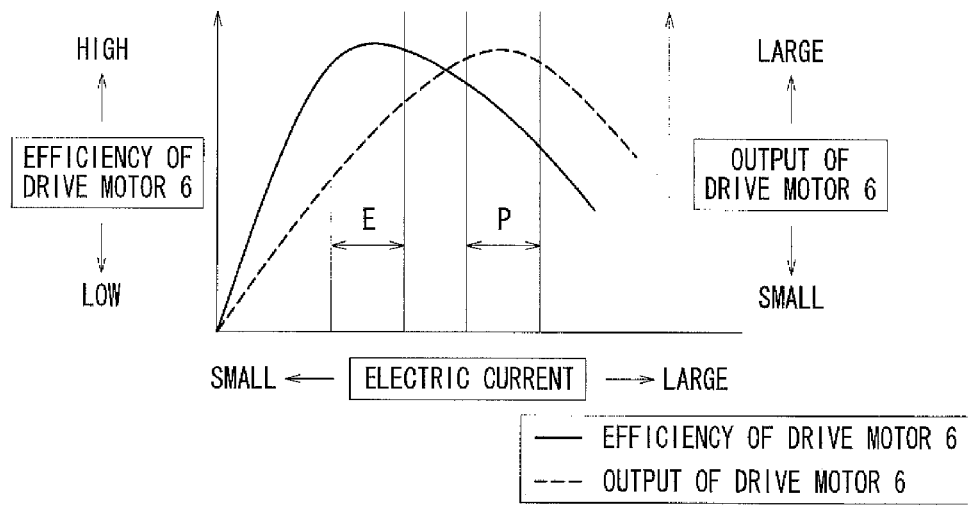
FIG. 11 is a graph for showing efficiencies and output of the drive motor in relation to electric currents supplied to the drive motor.

FIG. 11 illustrates a relationship between the value of the electric current supplied to the drive motor 6, the motor efficiency (the left-hand scale), and the motor output (the right-hand scale). The solid line in FIG. 11 indicates the change in motor efficiency, and the dashed line indicates the change in motor output. As indicated by the solid line of FIG. 11, the motor efficiency of the drive motor 6 is at its peak within a range of the electric current value (indicated by symbol E in FIG. 11), and the motor efficiency is highest when a electric current is supplied. Giving high priority to the electric current value at which the motor efficiency is at its peak, the transmission motor 40 is controlled, and the transmission gear ratio of the CVT 7 is controlled with the fluctuation in load torque. Thus, in the range of T3 to T4 shown in FIG. 10, there is executed an eco mode in which high priority is given to motor efficiency.

As indicated by the dashed line in FIG. 11, the peak of the output of the drive motor 6 (indicated by symbol P in FIG. 11) is in a region where the electric current value is higher than the efficiency value. The electric current value for the drive motor 6 is detected by the second condition detection device J2, and high priority is given to maintaining the output peak of the electric current value indicated by the dashed line, thus making it possible to control the transmission gear ratio of the CVT 7. As a result, it is possible to execute a power mode in which high priority is given to the motor output.

At the point in time, when the load torque of the intermediate shaft 30 has been increased to T4 of FIG. 10, the transmission gear ratio of the CVT 7 is maintained at a maximum of 1/4. From this point onward, the RPM of the drive motor 6 is reduced with the increase in load torque, and the RPM of the intermediate shaft 30 is reduced. At the point in time when the load torque of the intermediate shaft 30 is removed with the completion of the operation, the transmission gear ratio of the CVT 7 is maintained at 1/4.

As described above and shown in FIG. 8, the operation control device C0 controls both the drive motor 6 and the CVT 7 according to the pulling amount of the switch lever 11. At the stage (S0 to S1) where the pulling amount of the switch lever 11 is small, high priority is given to the motor velocity change. At the stage where the pulling amount is large (S1 to S3), high priority is given to the change of the transmission gear ration of CVT. Thus, it is possible for the user to easily obtain the requisite RPM for the rotary cutter solely through the operation of the switch lever 11.

Further, as shown in FIG. 9, when an operation is performed while maintaining the switch lever 11 in the half-pulled state S2 the RPM of the drive motor 6 is controlled with the transmission gear ratio of the CVT 7 maintained at a fixed level. In other words, control is performed so as to maintain a fixed transmission gear ratio for the CVT 7. As a result, the drive motor 6 is not easily locked due to over-torque.

In the fully pulled state 83 of the switch lever 11, the second condition detection device J2 detects the motor electric current value. The transmission gear ratio of the CVT 7 is controlled based on the value of the motor electric current. As a result, it is possible to automatically switch between an eco mode in which high priority is given to the motor efficiency and a power mode in which high priority is given to the motor output.

Figure 12:
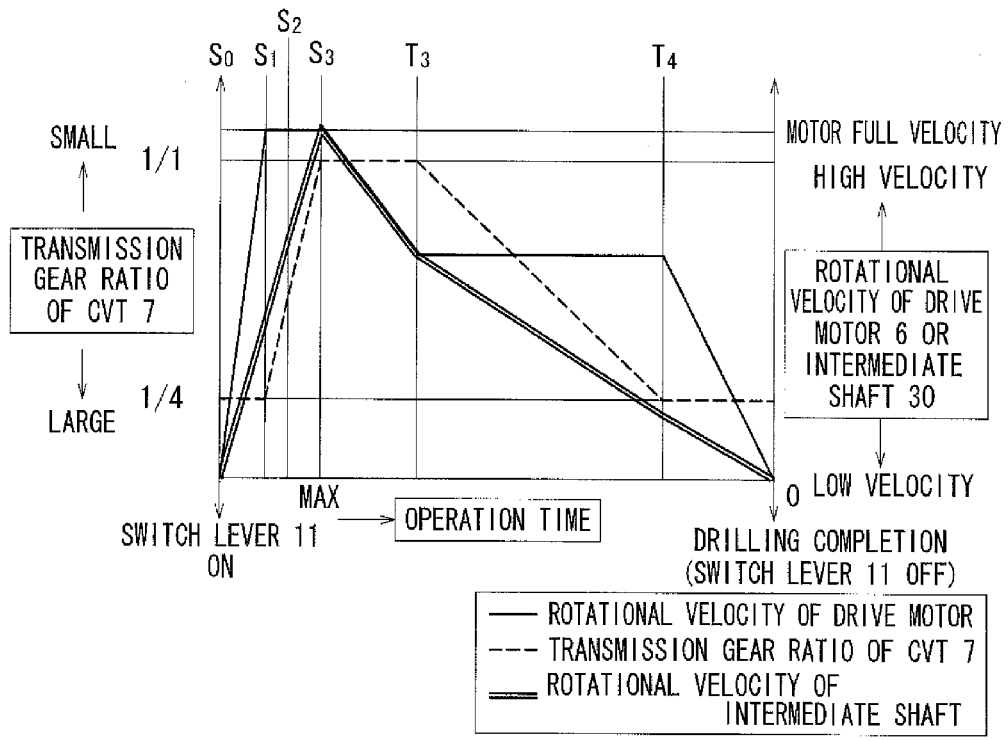
FIG. 12 is a graph for showing relationships the gear ratios of the continuously variable transmission and the rotational output velocity when the gear ratios of the continuously variable transmission are shifted from a high velocity state to a low velocity state during an operation.

FIG. 12 illustrates the relationship between the RPM of the drive motor 6, the transmission gear ratio of the CVT 7, and the RPM of the intermediate shaft 30 as the operation proceeds in the situation where a drilling operation is performed by using the power tool 1. The range of S0 to S3 of FIG. 12 coincides with the relationship from the pulling start S0 to the fully pulled state S3 of the switch lever 11 shown in FIG. 8. The range of S3 - T3 -T4 -drilling completion in FIG. 12 coincides with the relationship when the load torque fluctuates in the fully pulled state S3 of the switch lever 11 shown in FIG. 10.

As shown in FIG. 12, in the initial state (S0) in which the switch lever 11 has not been pulled yet, the intermediate shaft 30 and the spindle 9 are at rest (which means their RPM is zero), and the transmission gear ratio of the CVT 7 is set to 1/4.

In the initial state (S0 to S1) in which the switch lever 11 has begun to be pulled, the transmission motor 40 is not started, and the transmission gear ratio of the CVT 7 is maintained at 1/4. The RPM of the drive motor 6 increases in accordance with the pulling amount of the switch lever 11 (based on the detection by the first condition detection device J1). When the pulling amount of the switch lever 11 is increased, the transmission motor 40 starts at the point in time S1 when the drive motor 6 has attained the full velocity rotation state, and the transmission ring 26 begins to be displaced to the small-diameter region of each planetary roller 20. As a result, the transmission gear ratio of the CVT 7 is gradually reduced from 1/4 toward 1/1. Thus, even when the drive motor 6 is maintained in the full velocity state, the RPM of the intermediate shaft 30 continues to increase.

When the switch lever 11 attains the fully pulled state S3, the transmission ring 26 is displaced to the small-diameter region of each planetary roller 20 by the transmission motor 40. As a result, the transmission gear ratio of the CVT 7 attains a minimum of 1/1. In the fully pulled state S3, the drive motor 6 makes full velocity rotation, and the intermediate shaft 30 rotates at maximum velocity. Thereafter, in the stage where the drilling operation proceeds with the switch lever 11 in the fully pulled state S3, the transmission gear ratio of the CVT 7 is maintained at 1/1. Due to the increase in the load torque of the intermediate shaft 30, the RPM of the drive motor 6 and of the intermediate shaft 30 is reduced.

The electric current value of the drive motor 6 is detected by the second condition detection device J2, and it is indirectly detected that the load torque of the intermediate shaft 30 has attained a fixed value based on the electric current value. At the fixed load torque of T3, the control mode is automatically switched from a control mode based on the pulling amount of the switch lever 11 to a control mode based on the load torque. Thus, from here onward, as described with reference to FIG. 10, the transmission motor 40 is started in the reverse direction as the load torque of the intermediate shaft 30 (the electric current value of the drive motor 6) increases, and the transmission ring 26 begins to be displaced to the large-diameter region of each planetary roller 20. As a result, the transmission gear ratio of the CVT 7 gradually increases.

On the other hand, while the transmission gear ratio increases, the RPM of the drive motor 6 is maintained at a relatively high level. Thus, although the velocity of the intermediate shaft 30 is reduced, there is maintained a state in which the efficiency of the drive motor 6 is at its highest (within the range indicated by symbol E in FIG. 11). A drilling operation is performed in this state. At the point in time T4 when the transmission gear ratio attains a ratio of 1/4 with the increase in the load torque, the transmission motor 40 stops, and the transmission gear ratio of the CVT 7 begins to be gradually reduced. Thus, the RPM of the intermediate shaft 30 decreases, and the load torque applied to the intermediate shaft 30, i.e., the output torque, gradually increases, and the drilling operation is completed. When, thereafter, the pulling operation on the switch lever 11 is released, the drive motor 6 stops. Thus, the intermediate shaft 30 and the spindle 9 stop, and the CVT 7 is maintained at the transmission gear ratio of the initial state, i.e., 1/4.

In the control mode shown in FIG. 12, the second condition detection device J2 indirectly detects an increase in the load torque of the intermediate shaft 30, and the transmission gear ratio of the CVT 7 is changed to a maximum of 1/4. After this, the load torque increases, and the RPM of the drive motor 6 decreases. As a result, the output torque of the intermediate shaft 30 and of the spindle 9 corresponding to the load torque increases until the completion of the drilling.

Figure 13:
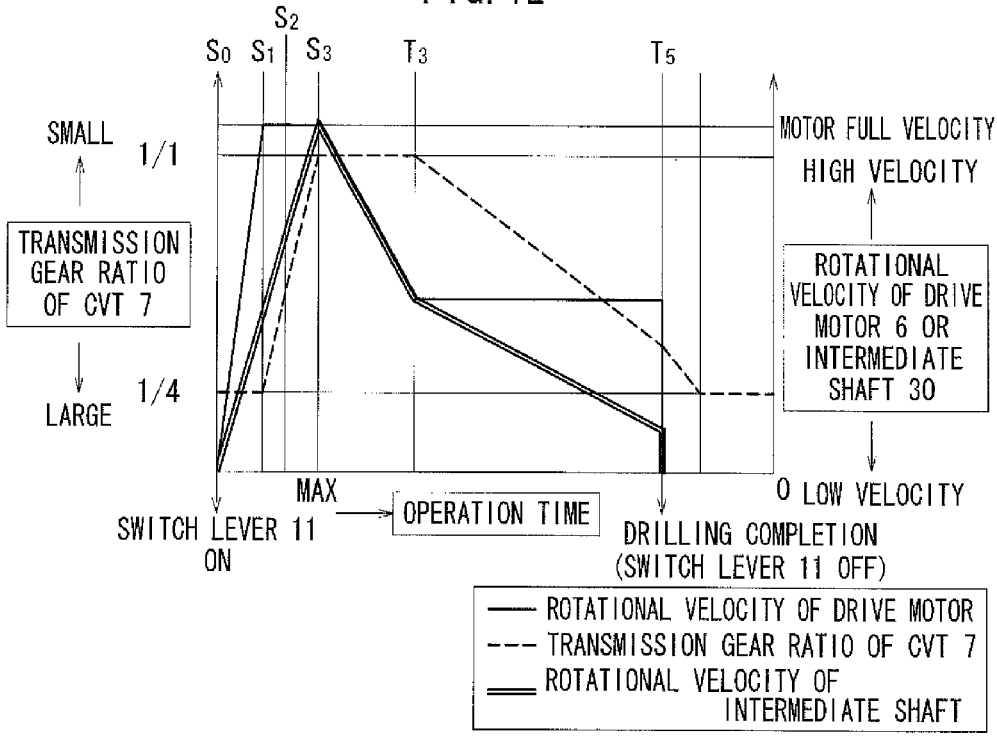
FIG. 13 is a graph for showing relationships between the gear ratios of the continuously variable transmission and the rotational output velocity when a pulling of the switch lever is released while the gear ratios of the continuously variable transmission are shifted from the high velocity state to the low velocity state during operation.

FIG. 13 shows a control mode in the situation where the drilling operation is completed at the stage T5. This stage T5 is halfway through the gradual increase in the transmission gear ratio of the CVT 7 from 1/1 to 1/4 with the increase in the load torque of the intermediate shaft 30. The same control mode is adopted in the section S0 to T3 of FIG. 13 as in the section S0 to T3 of FIG. 12.

As shown in FIG. 13, when the drilling is completed at the stage T5, which is halfway through the gradual increase in the transmission gear ration of the CVT 7, the load torque of the spindle 9 is reduced in a short period of time. This is detected by the second and fifth condition detection devices J2 and J5. When it is detected at the point in time T5 that the drilling has been completed, the rotational velocity of the transmission motor 40 increases, and the transmission ring 26 is displaced to the large-diameter region of each planetary roller 20. The transmission gear ratio here is restored to the initial value, i.e., 1/4. When, upon the completion of the drilling, the user releases the pulling operation on the switch lever 11, and the switch main body 12 is turned off, the rotation of the drive motor 6, which has been maintained at a RPM at the stage of T3 to T5, is stopped. Thus, the intermediate shaft 30 and the spindle 9 stop.

As described above and shown in FIG. 6, the power tool 1 has the continuously variable transmission 7, the condition detection devices J1 to J3 and J5, and the operation control device C0. The continuously variable transmission 7 changes the rotational output from the drive motor 6 with respect to the velocity before outputting it to the spindle 9 to which the tip tool is mounted. The condition detection devices J1 to J3 and J5 detect the condition of the power tool 1. The operation control device C0 determines the target RPM of the spindle 9 based on the condition of the power tool 1 detected by the condition detection devices J1 to J3 and J5, and controls the RPM of the drive motor 6 and/or the transmission gear ratio of the continuously variable transmission 7 based on the target RPM.

Thus, as a condition of the power tool 1, the condition detection devices J1 to J3 and J5 detect the operation amount or operation force applied to the operation member (switch lever 11), the electric current value or temperature of the drive motor 6, the RPM or output torque of the spindle 9, or a change with passage of time of each condition. Based on this, one or both of the RPM of the drive motor 6 as well as the transmission gear ratio of the continuously variable transmission 7 are appropriately controlled. Thus, the RPM of the drive motor 6 and the transmission gear ratio of the continuously variable transmission 7 are controlled automatically and appropriately with a high level of reproducibility in accordance with the operational condition. Thus, it is possible to achieve an improvement in terms of operational efficiency and uniformity.

The power tool 1 has a plurality of different condition detection devices J1 to J3 and J5. Thus, it is possible to control the power tool 1 sensitively and in an optimum fashion based on the operational condition of the user and the condition of the power tool.

As the plurality of different condition detection devices, the power tool 1 is equipped with a device (J1) configured to detect the operational condition of the user, and devices (J2 and J3) configured to detect the condition of the tool main body 2, which changes with the operation by the user. The operation control device C0 controls the RPM of the drive motor 6 and/or the transmission gear ratio of the continuously variable transmission 7 based on the operational condition of the user, and controls the condition of the tool main body 2 at a predetermined, optimum state.

Thus, the power tool 1 is controlled in an optimum state within a range allowed by the tool main body 2 with respect to the output required by the user. As a result, it is possible to prevent damage to the power tool 1 due to the load torque, etc. while maintaining an operational efficiency as high as possible.

The operation control device C0 exhibits a plurality of control patterns with respect to the RPM of the drive motor 6 and the transmission gear ratio of the continuously variable transmission 7. Based on the condition of the power tool 1 detected by the condition detection devices J1 to J3 and J5, the operation control device C0 selects one control pattern out of the plurality of control patterns, and controls the RPM of the drive motor 6 and the transmission gear ratio of the continuously variable transmission 7 by the selected control pattern.

The plurality of control patterns includes a control pattern (eco mode) in which the efficiency of the drive motor is optimized, and a control pattern (power mode) in which the output of the drive motor is optimized. Thus, according to the nature of the operation or the operational stage, the eco mode and the power mode are automatically selected based on the detection by the condition detection devices J1 to J3 and J5. In accordance with the selected control pattern, the RPM of the drive motor 6 and the transmission gear ratio of the continuously variable transmission 7 are appropriately controlled. Thus, it is possible to improve the operational efficiency. Since the control pattern is automatically selected, the operation can be repeated with a higher level of reproducibility as compared to the situation where the user selects the control pattern.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

As shown in FIG. 6, it is possible for the condition detection devices J1 to J3 and J5 to be provided in the power tool 1, or for some other condition detection devices to be provided in as appropriate. For example, instead of or in addition to the condition detection devices J1 to J3 and J5, it is also possible to provide a condition detection device configured to detect the pulling operation force (pressing force) of the operation member, a condition detection device configured to detect the RPM of the drive motor 6, and a condition detection device configured to detect the RPM and load torque of the spindle 9.

Instead of or in addition to the condition detection devices J1 to J3 and J5, it is also possible to provide a condition detection device configured to detect the switching condition of a normal/reverse switching operation member for switching the rotational direction of the drive motor 6. Depending on the difference in the rotational direction of the drive motor 6, it is also possible to perform a different control with respect to the RPM of the drive motor or the transmission gear ratio of the CVT 7.

Instead of or in addition to the condition detection devices J1 to J3 and J5, it is also possible to provide a condition detection device configured to detect the stress condition of the CVT 7, the intermediate shaft 30, or the spindle 9. For example, it is also possible to detect the deformation amount, pressure, etc. of a member by using a strain gauge and a load cell.

Instead of or in addition to the condition detection devices J1 to J3 and J5, it is also possible to provide a condition detection device configured to detect the electric current value and the temperature at the battery pack 4. Alternatively, it is also possible to provide a device configured to detect a member wherein the temperature of the member varies in proportion to the load of the motor housing, bearing, etc. or the motor temperature.

As the plurality of different condition detection devices, the power tool 1 may have at least two of the following condition detection devices: the first condition detection device J1 configured to detect the operational condition of the operation member for starting the drive motor, the second condition detection device J2 configured to detect the electric current value, the third condition detection device J3 configured to detect temperature, the fourth condition detection device J4 configured to detect the stress condition of the drive transmission system, and the fifth condition detection device J5 configured to detect changes with passage of time in the first through fourth condition detection devices. As a result, it is possible to improve the operational efficiency and uniformity.

The power tool 1 may have the gear transmission mechanism 8 as shown in FIG. 1; or it may also have none.

The power tool 1 may be a rechargeable driver drill as shown in FIG. 1, or some other electric tool such as a disc grinder or a cutter. The power tool 1 may have an electric motor (drive motor 6) as the drive source as shown in FIG. 1; or it may also be an air tool having an air motor as the drive source. It is also possible for the air tool to have a condition detection device configured to detect the pressure of the supplied compressed air.

The invention claimed is:

1. A power tool comprising:
   a continuously variable transmission configured to change a velocity of a rotational output from a drive motor and to output the rotational output to a spindle to which a tip end tool is mounted;
   a condition detection device configured to detect a condition of the power tool; and
   an operation control device configured to (i) exhibit a plurality of control patterns with respect to RPM of the drive motor and a transmission gear ratio of the continuously variable transmission, (ii) determine a target RPM of the spindle based on the condition of the power tool detected by the condition detection device, (iii) select one control pattern out of the plurality of control patterns, and (iv) control the RPM of the drive motor and the transmission gear ratio of the continuously variable transmission based on the target RPM and the selected control pattern.

2. The power tool of claim 1, wherein the power tool comprises a plurality of different condition detection devices.

3. The power tool of claim 2, wherein as the plurality of different condition detection devices, the power tool comprises a device configured to detect an operational condition of a user, and a device configured to detect a condition of a tool main body which changes with an operation by the user, and
   wherein the operation control device is configured to control the RPM of the drive motor and the transmission gear ratio of the continuously variable transmission based on the operational condition of the user, and control a condition of the tool main body to a predetermined state.

4. The power tool of claim 2, wherein as the plurality of different condition detection devices, the power tool comprises at least two of the following condition detection devices: a first condition detection device configured to detect an operational condition of the operation member for starting the drive motor, a second condition detection device configured to detect an electric current value, a third condition detection device configured to detect a stress condition of a drive transmission detection device configured to detect temperature, a fourth condition system, and a fifth condition detection device configured to detect changes with passage of time in any of the first to fourth condition detection devices.

5. The power tool of claim 1, wherein the plurality of control patterns includes a control pattern in which higher priority is given to an efficiency of the drive motor than the output of the drive motor, and a control pattern in which higher priority is given to the output of the drive motor than the efficiency of the drive motor.

6. The power tool of claim 1, wherein the continuously variable transmission comprises a plurality of planetary rollers supported by a holder and the planetary rollers are each in contact with a sun roller, a pressure roller, and a transmission ring.

7. The power tool of claim 6, further comprising a planetary gear mechanism downstream of the continuously variable transmission in a power transmission route.

8. The power tool of claim 7, wherein the planetary gear mechanism has a fixed transmission gear ratio.

9. The power tool of claim 8, wherein the rotational output of the drive motor is continuously varied by the continuously variable transmission and reduced in velocity by the planetary gear mechanism, in use, before being outputted to the spindle.

10. The power tool of claim 1, wherein the operation control device includes a drive motor control circuit configured to control the RPM of the drive motor and a transmission motor control circuit configured to control the transmission gear ratio of the continuously variable transmission.

11. The power tool of claim 10, wherein the transmission motor control circuit is configured to change the transmission gear ratio of the continuously variable transmission by controlling start/stop timing, rotational direction, and RPM of a transmission motor.

* * * * *